United States Patent
Chou et al.

(10) Patent No.: US 6,922,901 B1
(45) Date of Patent: Aug. 2, 2005

(54) LIGHT LEVELING DEVICE HAVING REMOTE CONTROL

(76) Inventors: Chiu Yen Chou, P.O. Box 63-99, Taichung (TW), 406; Shu Chen Chang, P.O. Box 63-99, Taichung (TW), 406

( * ) Notice: Subject to any disclaimer, the term of this patent is extended or adjusted under 35 U.S.C. 154(b) by 0 days.

(21) Appl. No.: 10/770,239

(22) Filed: Jan. 29, 2004

(51) Int. Cl.$^7$ .............................................. G01C 5/00
(52) U.S. Cl. ............................ 33/290; 33/279; 33/281; 33/286
(58) Field of Search .................... 33/276, 280, 281, 33/282, 283, 285, 286, 290, 291, DIG. 21

(56) References Cited

U.S. PATENT DOCUMENTS

| | | | | |
|---|---|---|---|---|
| 5,367,779 A | * | 11/1994 | Lee ............................... | 33/290 |
| 5,588,216 A | * | 12/1996 | Rank et al. ..................... | 33/286 |
| 5,680,208 A | * | 10/1997 | Butler et al. ................... | 33/283 |
| 5,713,135 A | * | 2/1998 | Acopulos ....................... | 33/286 |
| 5,790,248 A | * | 8/1998 | Ammann ....................... | 33/283 |
| 5,864,956 A | * | 2/1999 | Dong ............................ | 33/280 |
| 6,065,217 A | * | 5/2000 | Dong ............................ | 33/290 |
| 6,427,347 B1 | * | 8/2002 | Butler, Sr. .................... | 33/286 |
| 6,430,823 B1 | * | 8/2002 | Seki ............................. | 33/281 |
| 2003/0123153 A1 | * | 7/2003 | Ohtomo et al. ............... | 33/286 |

* cited by examiner

*Primary Examiner*—Christopher W. Fulton
*Assistant Examiner*—Madeline Gonzalez
(74) *Attorney, Agent, or Firm*—Charles E. Baxley (57) ABSTRACT

A light leveling device includes a stationary light instrument received in a housing, and a rotatable light instrument rotatably attached to the housing, to allow the rotatable light instrument to be rotated and adjusted relative to the housing and the stationary light instrument. A carrier is rotatably secured to the housing to support the rotatable light instrument, and a motor may be coupled to the carrier to rotate and adjust the carrier and the rotatable light instrument relative to the housing automatically. A remote control device may further be used to remotely control the motor.

14 Claims, 7 Drawing Sheets

LIGHT LEVELING DEVICE HAVING REMOTE CONTROL

The present invention relates to U.S. patent application Ser. No. 10/689,493, filed 17 Oct. 2003, pending.

BACKGROUND OF THE INVENTION

1. Field of the Invention

The present invention relates to a laser or light leveling device, and more particularly to a light leveling device including a remote control device to effectively rotate the laser or light instrument.

2. Description of the Prior Art

Various kinds of typical laser or light leveling devices have been developed and comprise one or more laser or light instruments attached thereto for generating one or more light beams or straight lines or reference lines of optical images toward or against wall members, for leveling or plumbing purposes.

However, the typical laser or light leveling devices are required to be adjusted manually, and may not be controlled or adjusted by motors and/or by remote control devices.

The present invention has arisen to mitigate and/or obviate the afore-described disadvantages of the conventional laser or light leveling devices.

SUMMARY OF THE INVENTION

The primary objective of the present invention is to provide a light leveling device including a remote control device to remotely rotate or adjust a laser or light instrument relative to a support base, and to retain the laser or light instrument relative to the support base at the predetermined or required positions or angular positions.

In accordance with one aspect of the invention, there is provided a light leveling device comprising a housing, a first light instrument attached to the housing, a second light instrument rotatably attached to the housing, to allow the second light instrument to be rotated and adjusted relative to the housing and the first light instrument, and a motor driving device for driving and rotating the second light instrument relative to the housing and the first light instrument.

The first light instrument includes a lens attached thereto. The lens includes at least one line provided thereon.

The housing includes a carrier rotatably secured to the housing, and the carrier includes a cavity formed therein to receive the second light instrument therein. The housing includes a chamber formed therein and defined by a fence, to rotatably receive the carrier. The fence includes an aperture formed therein and communicating with the chamber of the housing, the carrier includes a shaft extended therefrom and rotatably engaged through the aperture of the fence, to rotatably secured the carrier to the fence of the housing.

The motor driving device includes a motor coupled to the carrier, to rotate and adjust the carrier relative to the housing, a first wheel provided on the carrier, and a second wheel engaged with the first wheel to rotate and adjust the first wheel and the carrier relative to the housing when the second wheel is rotated relative to the first wheel.

The housing includes a post to rotatably support the second wheel therein. The post includes a bore formed therein, the second wheel includes an axle extended therefrom and rotatably engaged through the bore of the post, to rotatably secure the second wheel to the post. A knob may further be provided and attached to the second wheel to rotate the second wheel relative to the first wheel.

The motor driving device includes a coupling device for coupling the motor to the second wheel and to drive the second wheel. The second wheel includes an axle, the coupling device includes a first gear attached on the axle, and a second gear attached to the motor and engaged with the first gear.

A remote control device may further be provided for remotely controlling the motor, and includes a control device coupled to the motor, and an emitting device to emit signals to actuate the control device to remotely operate the motor.

The second light instrument includes a lens attached thereto. The lens includes at least one line provided thereon. The housing includes at least one seat provided therein, and at least one vial received in the seat of the housing. The housing includes a base having at least one adjusting member attached to bottom thereof.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
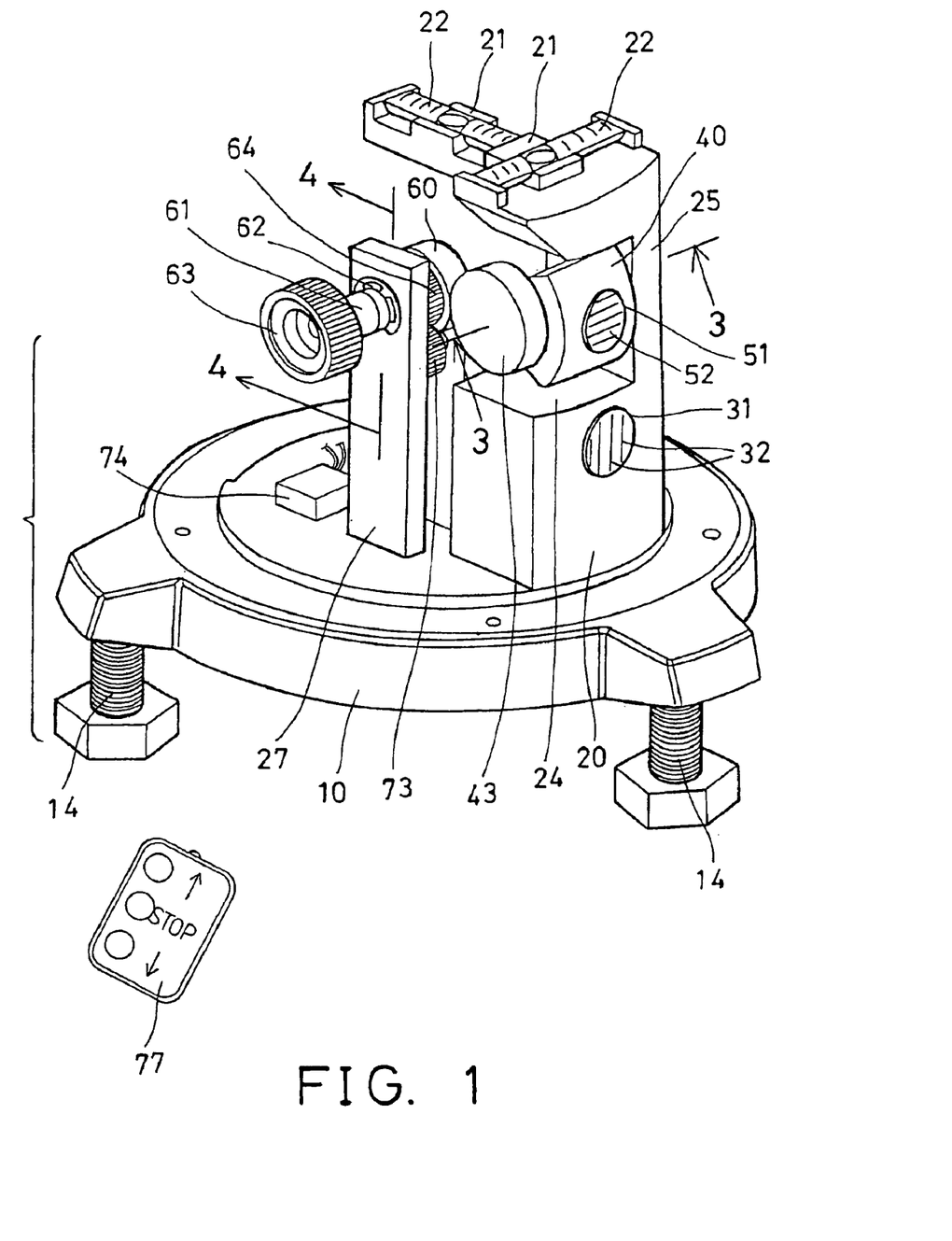
FIG. 1 is a partial exploded view of a light leveling device in accordance with the present invention.
Figure 2:
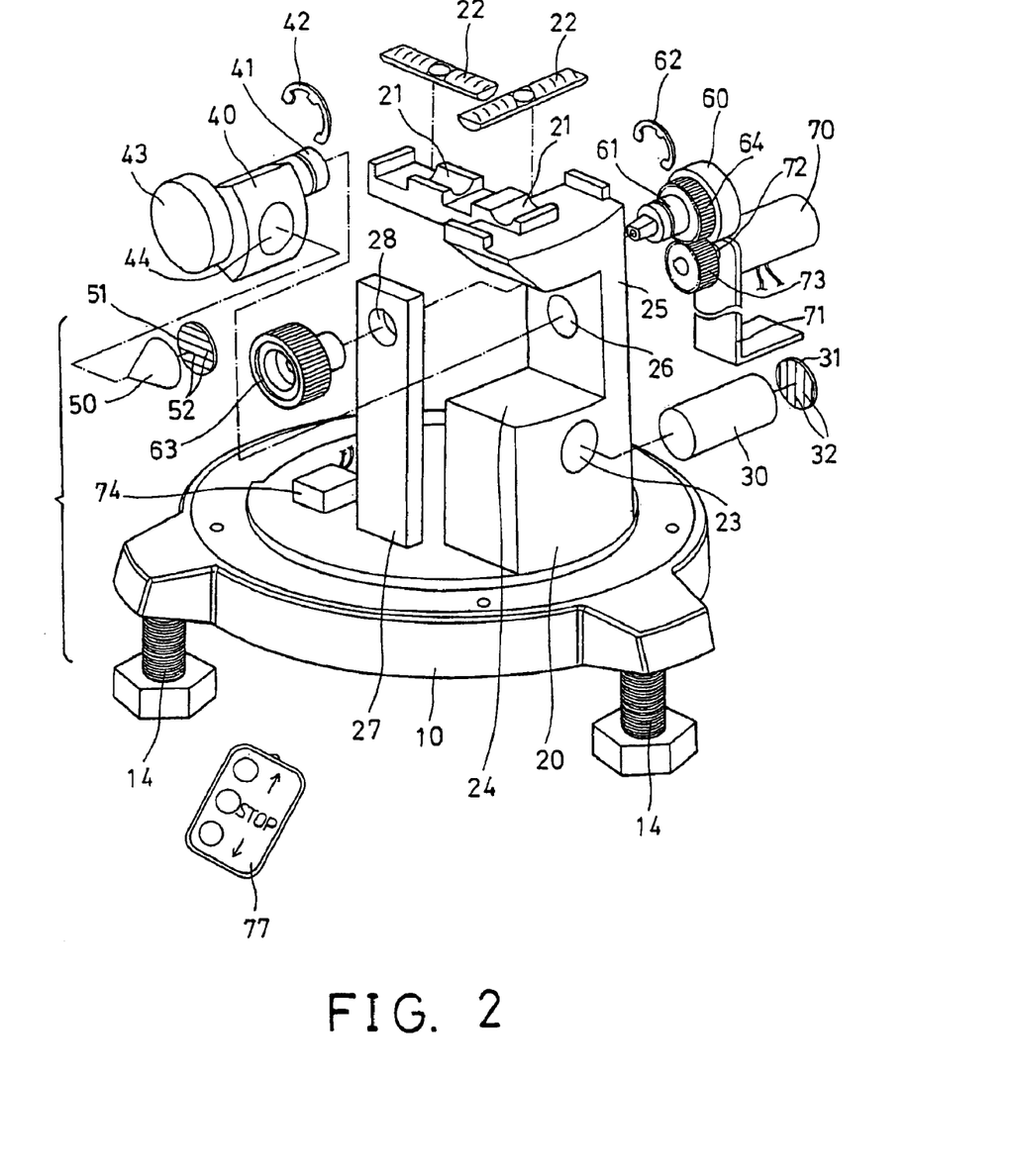
FIG. 2 is another partial exploded view of the light leveling device.

Referring to the drawings, and initially to FIGS. 1 and 2, a light leveling device in accordance with the present invention comprises a base 10, and a supporting housing 20 disposed on the base 10 and including a one or more seats 21 provided thereon for supporting level vials 22 therein. The base 10 includes one or more adjusting members 14, such as adjusting screws 14 attached to the bottom thereof, to adjust the base 10 to a horizontal level or position with the vials 22.

The housing 20 includes an orifice 23 formed therein for receiving a laser or light instrument 30 received and positioned therein. The laser or light instrument 30 includes a lens 31 attached to the front portion thereof and having two or more vertical and parallel lines 32 formed or provided therein, for forming or generating vertical and parallel lines 33 (FIGS. 5, 6) on wall members (not shown).

The housing 20 further includes a notch or a chamber 24 formed therein and defined by a fence 25, and includes an aperture 26 formed in the fence 25 (FIGS. 2, 3), and communicating with the chamber 24 of the housing 20. It is preferable that the aperture 26 of the fence 25 is extended in a direction perpendicular to the orifice 23 of the housing 20 and to the laser or light instrument 30.

A carrier 40 includes a shaft 41 extended therefrom and rotatably engaged through the aperture 26 of the fence 25, and rotatably secured to the fence 25 with such as a retaining ring 42, to allow the carrier 40 to be rotated and adjusted relative to the fence 25 of the housing 20. The carrier 40 includes a gear or roller or wheel 43 provided thereon, and preferably located opposite or distal to the shaft 41.

Figure 3:
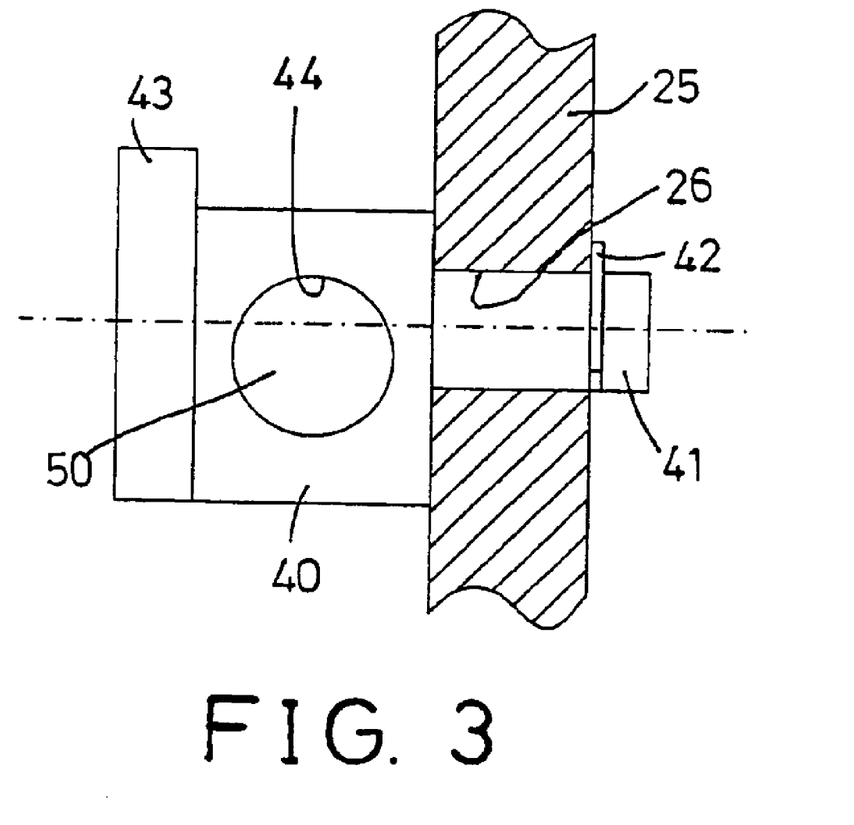
FIGS. 3, 4 are partial cross sectional views taken along lines 3—3 and 4—4 of FIG. 1 respectively.

The carrier 40 further includes a cavity 44 formed therein for receiving another laser or light instrument 50 therein (FIG. 3). The laser or light instrument 50 also includes a lens 51 attached to the front portion thereof and having two or more horizontal and parallel lines 52 formed or provided therein, for forming or generating horizontal and parallel lines 53 (FIGS. 5, 6) on wall members (not shown), and to allow the parallel lines 53 to be perpendicular to the parallel lines 33 generated by the laser or light instrument 30.

Figure 5:
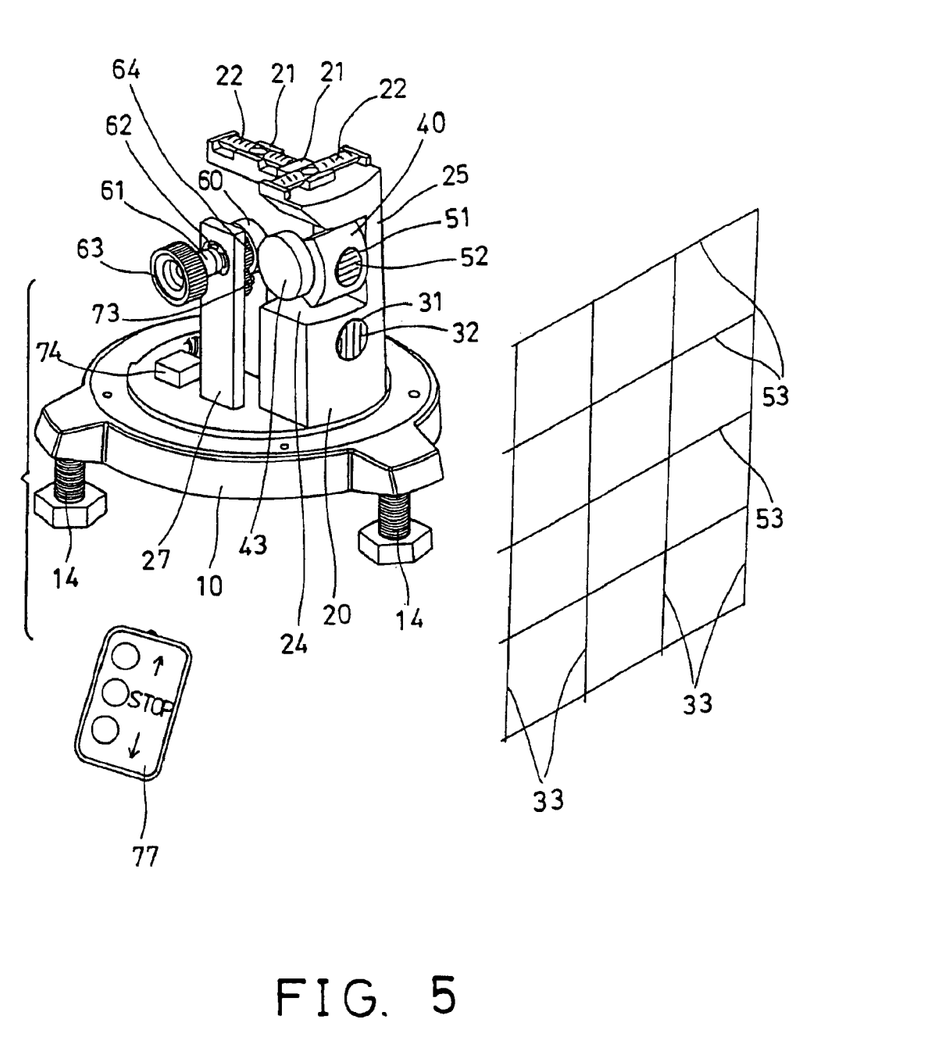
FIGS. 5, 6 are partial exploded views illustrating the operation of the light leveling device.
Figure 6:
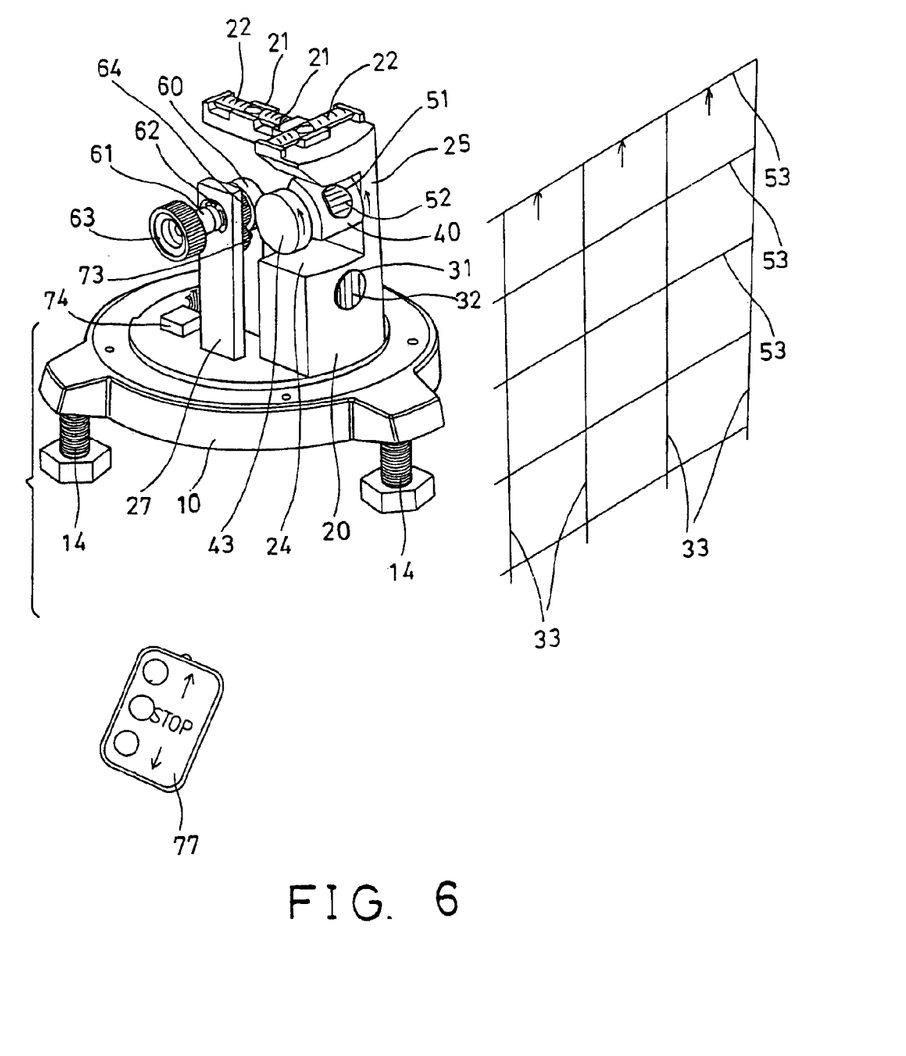

In operation, the carrier 40 is rotatable or adjustable relative to the housing 20 to adjust and direct the laser or light instrument 50 up and down relative to the housing 20, in order to adjust the parallel lines 53 up and down relative to the parallel lines 33 that are generated by the laser or light instrument 30, best shown in FIGS. 5 and 6.

The base 10 or the housing 20 further includes a post 27 extended from such as the base 10, and having a bore 28 formed therein. Another gear or roller or wheel 60 includes an axle 61 extended therefrom and rotatably engaged through the bore. 28 of the post 27 or of the housing 20 (FIG. 4), and rotatably secured to the post 27 or the housing 20 with such as a retaining ring 62, to allow the wheel 60 to be rotated and adjusted relative to the post 27 or the housing 20.

The wheel 60 is engaged with the wheel 43 of the carrier 40 (FIG. 1) with such as a gear-engagement, or a force-fitted engagement, to allow the wheel 43 and thus the carrier 40 to be rotated or adjusted relative to the post 27 or the housing 20 by the wheel 60. A knob 63 may be secured to the wheel 60 or to the axle 61 of the wheel 60 to rotate and adjust the wheel 60 and thus the wheel 43 and the carrier 40 and the laser or light instrument 50 relative to the housing 20 and the laser or light instrument 30.

It is preferable that either or both of the wheels 43, 60 are made of rubber or coarse materials, to allow the wheels 43, 60 to be solidly contacted and engaged with each other, and to allow the wheel 43 to be solidly and effectively rotated by the other wheel 60. The laser or light instrument 50 may thus be effectively rotated or adjusted relative to the housing 20 and the laser or light instrument 30 by the wheel 60 and/or the knob 63.

The housing 20 and the post 27 and the base 10 may be formed as a support member for supporting the laser or light instruments 30, 50 and the carrier 40 and the wheel 60. The light instrument 50 and the carrier 40 may be rotated or adjusted relative to the housing 20 and the laser or light instrument 30 to any angular position simply by the wheel 43, or by the knob 63 and the other wheel 60.

In operation, as shown in FIG. 5, the lights or lines 33 generated by the light instrument 30 may be emitted onto and retained on the wall members. As shown in FIG. 6, the carrier 40 may be rotated or adjusted relative to the housing 20 and the laser or light instrument 30 to any angular position by the knob 63 and the engagement between the wheels 43, 60.

It is to be noted that the base 10 and the housing 20 may also be attached to a vertical wall (not shown) to have the parallel lines 33 generated by the laser or light instrument 30 to be arranged horizontally, and the parallel lines 53 generated by the laser or light instrument 50 to be arranged vertically and perpendicular to the horizontal lines 33.

Figure 4:
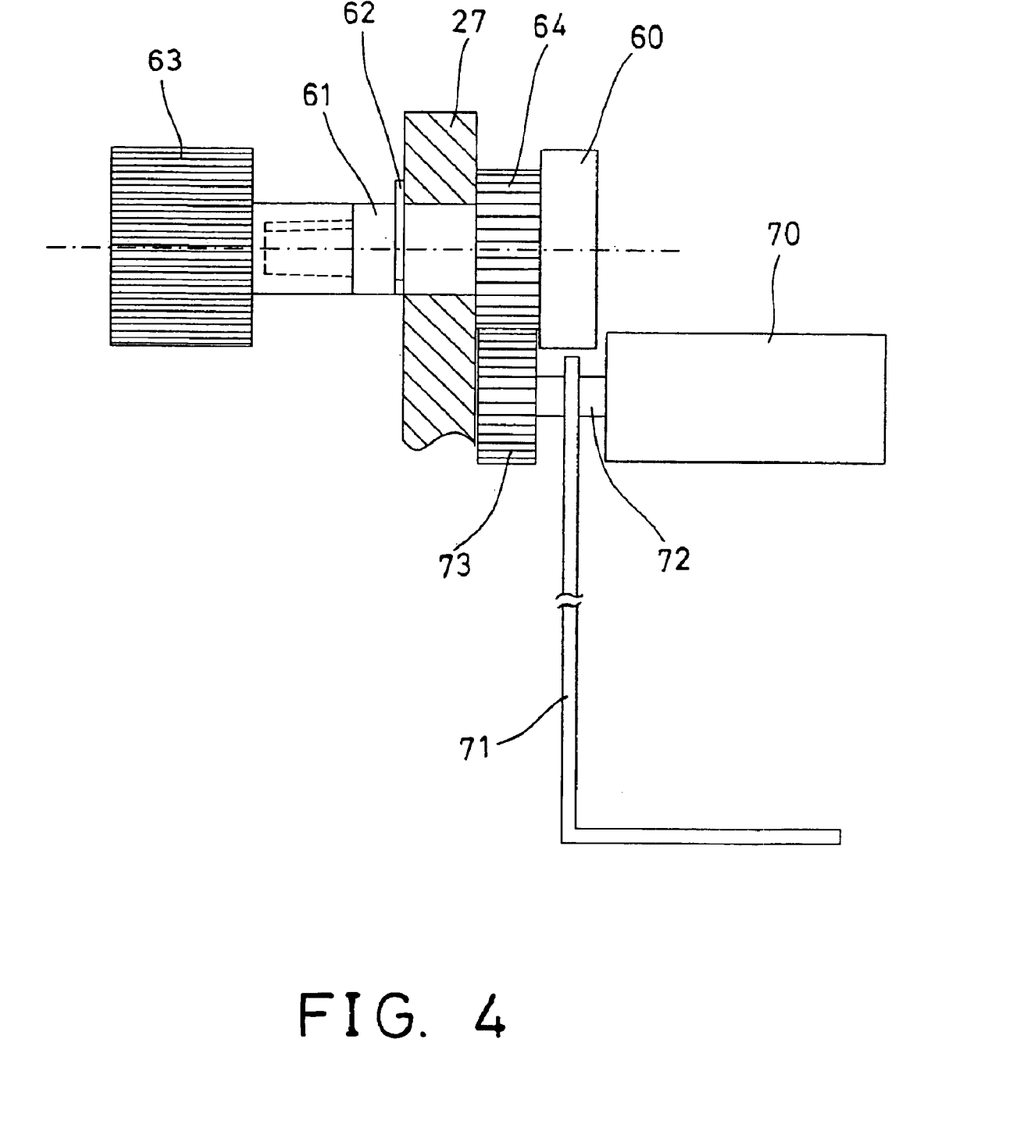

A driving device 70, such as a motor 70 may further be provided to drive or rotate or adjust the carrier 40 relative to the fence 25 of the housing 20. For example, a roller or wheel or gear 64 may be provided and attached to the carrier 40, or to the axle 61 of the wheel 60. The driving device 70 or the motor 70 may be attached to the post 27 of the housing 20 or of the base 10 with such as a bracket 71, and includes a spindle 72 having another roller or wheel or gear 73 attached thereto and engaged with the gear 64 of the axle 61 or of the wheel 60 (FIG. 4).

Figure 7:
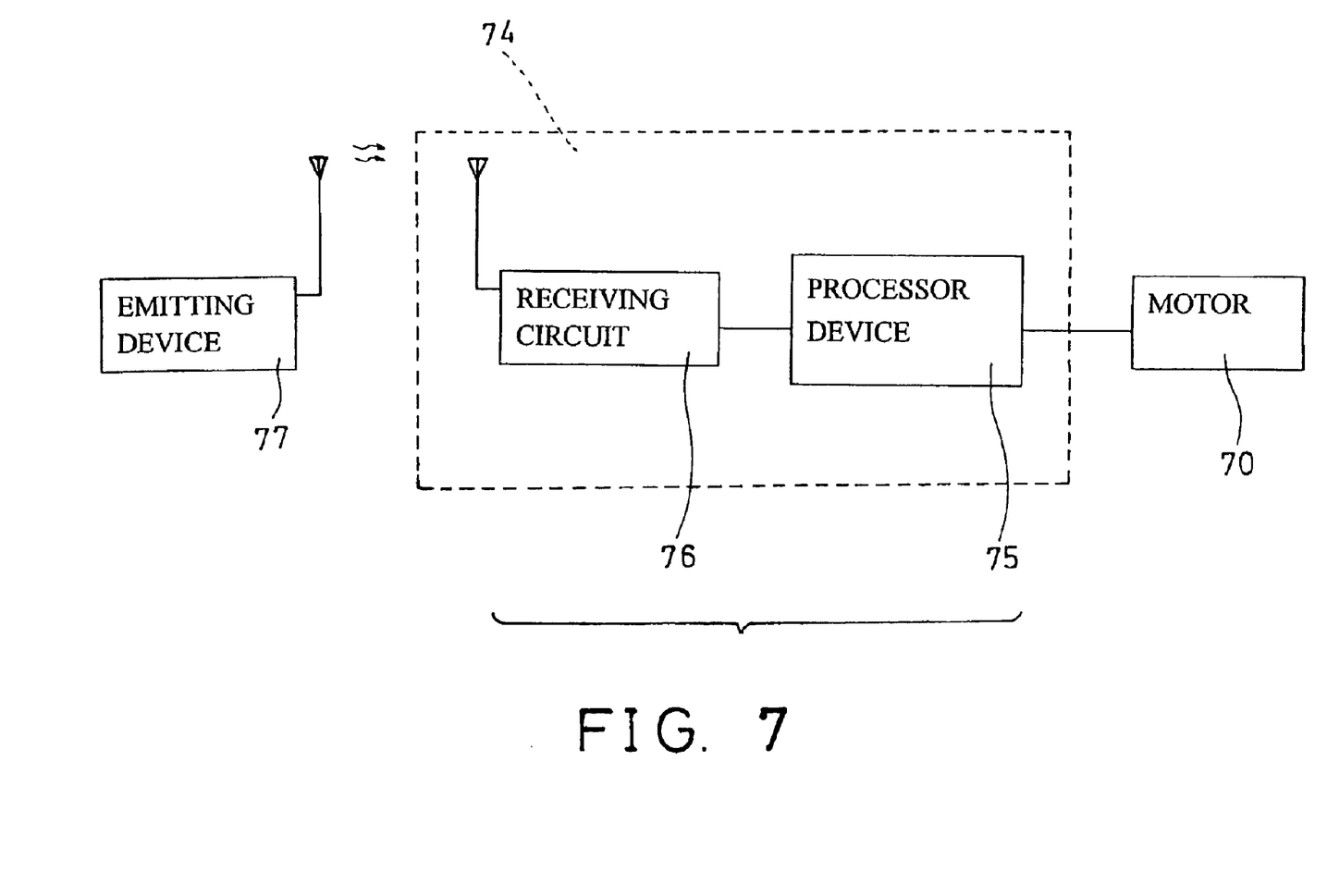
FIG. 7 is a block diagram illustrating the remote control device for the light leveling device.

As shown in FIG. 7, a control device 74 may be provided to control or to operate the motor 70, and includes a processor device 75 coupled to the motor 70, in order to control or operate the motor 70, and includes a signal receiving circuit 76 coupled to the processor device 75, for signal receiving purposes. The control device 74 further includes a signal controlling or emitting device 77 for emitting control signals to the signal receiving circuit 76, in order to control or operate the motor 70 via the processor device 75.

In operation, the carrier 40 may be automatically rotated or adjusted relative to the housing 20 and the laser or light instrument 30 to any angular position by the motor 70 via the wheels 43, 60 and the gears 64, 73. In addition, the motor 70 may be actuated or operated or controlled remotely by the control device 74.

It is to be noted that the gear 73 of the motor 70 may also be directly coupled to or engaged with the wheel 43 of the carrier 40, in order to directly rotate or control or adjust the carrier 40 relative to the housing 20 or the base 10.

Accordingly, the light leveling device in accordance with the present invention includes a rotatable laser or light instrument rotatable or adjustable relative to the support housing automatically by the motor, and/or remotely by the control device, for facilitating the leveling or plumbing purposes thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A light leveling device comprising:
    a housing including a carrier rotatable secured thereto and having a cavity formed therein,
    a first light instrument attached to said housing,
    a second light instrument received in said cavity of said carrier for being rotatably attached to said housing, to allow said second light instrument to be rotated and adjusted relative to said housing and said first light instrument, and
    motor driving means for driving and rotating said second light instrument relative to said housing and said first light instrument, said motor driving means including a first wheel provided on said carrier, a second wheel engaged with said first wheel to rotate and adjust said first wheel and said carrier relative to said housing when said second wheel is rotated relative to said first wheel, said second wheel including an axle, a first gear attached on said axle, a motor, and a second sear attached to said motor and engaged with said first gear, for coupling said motor to said second wheel and to drive said second wheel and said first wheel and said carrier relative to said housing.

2. The light leveling device as claimed in claim 1, wherein said first light instrument includes a lens attached thereto.

3. The light leveling device as claimed in claim 2, wherein said lens includes at least one line provided thereon.

4. The light leveling device as claimed in claim 1, wherein said housing includes a chamber formed therein and defined by a fence, to rotatably receive said carrier.

5. The light leveling device as claimed in claim 4, wherein said fence includes an aperture formed therein and communicating with said chamber of said housing, said carrier includes a shaft extended therefrom and rotatably engaged through said aperture of said fence, to rotatably secured said carrier to said fence of said housing.

6. The light leveling device as claimed in claim 1, wherein said housing includes a post to rotatably support said second wheel therein.

7. The light leveling device as claimed in claim 6, wherein said post includes a bore formed therein, said second wheel includes an axle extended therefrom and rotatably engaged through said bore of said post, to rotatably secure said second wheel to said post.

8. The light leveling device as claimed in claim 1 further comprising a knob attached to said second wheel to rotate said second wheel relative to said first wheel.

9. The light leveling device as claimed in claim 1 further comprising a remote control means for remotely controlling said motor.

10. The light leveling device as claimed in claim 9, wherein said remote control means includes a control device coupled to said motor, and an emitting device to emit signals to actuate said control device to remotely operate said motor.

11. The light leveling device as claimed in claim 1, wherein said second light instrument includes a lens attached thereto.

12. The light leveling device as claimed in claim 11, wherein said lens includes at least one line provided thereon.

13. The light leveling device as claimed in claim 1, wherein said housing includes at least one seat provided therein, and at least one vial received in said at least one seat of said housing.

14. The light leveling device as claimed in claim 1, wherein said housing includes a base having at least one adjusting member attached to bottom thereof.

* * * * *